United States Patent Office 3,336,405
Patented Aug. 15, 1967

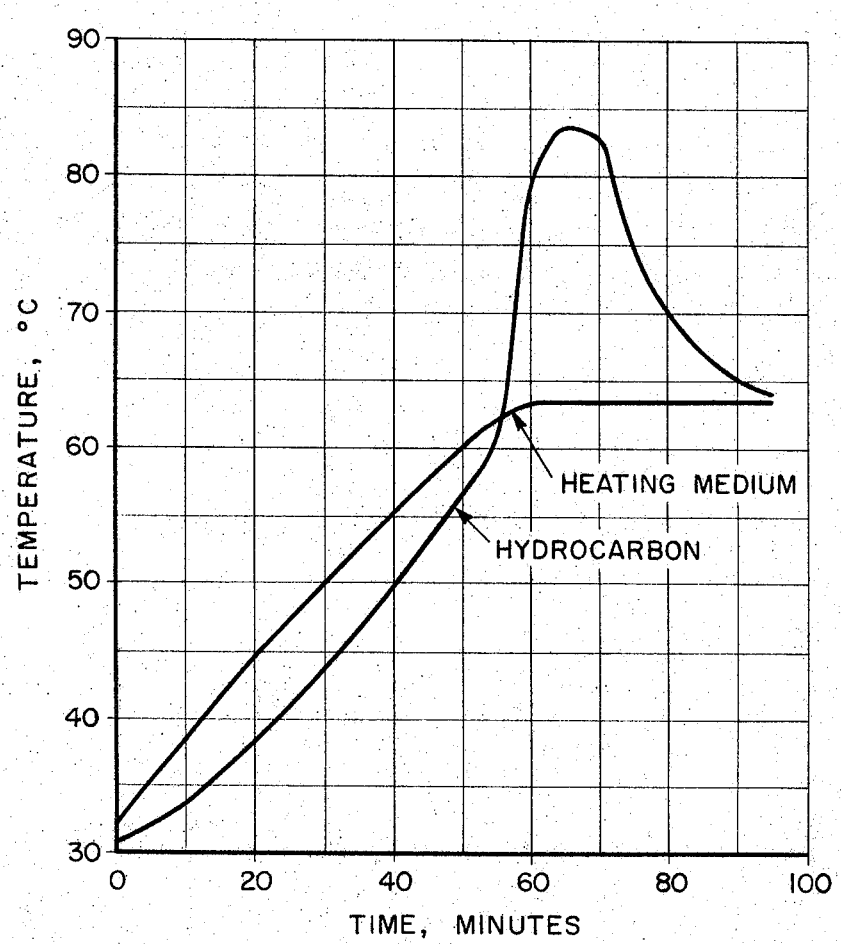

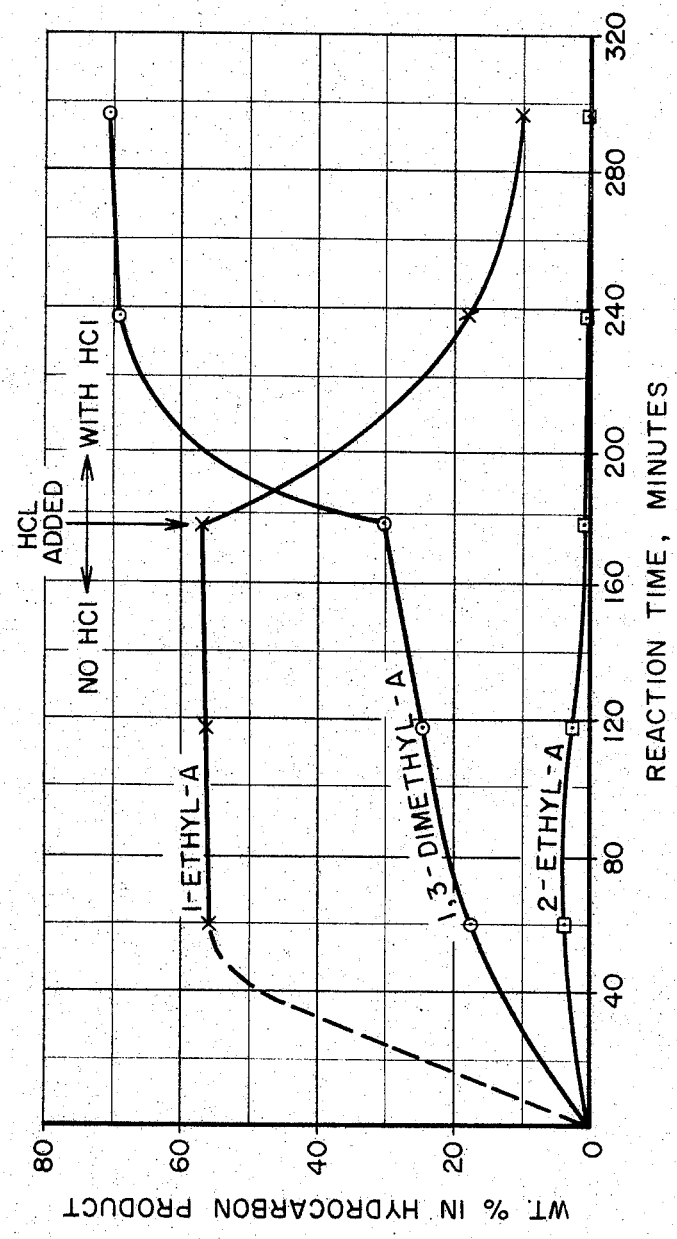

3,336,405
PREPARATION OF ALKYLADAMANTANES HAVING AN ETHYL SUBSTITUENT
Abraham Schneider, Overbrook Hills, and Edward J. Janoski, Havertown, Pa., and Roy W. McGinnis, Wilmington, Del., assignors to Sun Oil Company, Philadelphia, Pa., a corporation of New Jersey
Filed Sept. 10, 1965, Ser. No. 486,275
9 Claims. (Cl. 260—666)

This invention relates to the catalytic isomerization of $C_{12}$–$C_{15}$ tricyclic perhydroaromatic hydrocarbons to produce alkyladamantanes. More particularly the invention concerns the conversion of such perhydroaromatic hydrocarbons into adamantanes having the same number of carbon atoms and having an ethyl group attached to the adamantane nucleus. The alkyladamantanes prepared according to the invention are ethyladamantane ($C_{12}$), ethylmethyladamantane ($C_{13}$), ethyldimethyladamantane ($C_{14}$), and ethyltrimethyladamantane ($C_{15}$).

The conversion of tricyclic perhydroaromatic hydrocarbons of twelve or more carbon atoms to isomers having an adamantane nucleus has been described in United States Patent No. 3,128,316. As disclosed in the patent this isomerization is effected at a temperature in the range of $-5°$ C. to $50°$ C. by means of an aluminum chloride or bromide catalyst. The patent discloses that these hydrocarbons go through various isomerization stages and that the ultimate product, if the reaction is carried to completion, is mainly a polymethyladamantane having two or more methyl groups attached to bridgehead carbon atoms of the adamantane nucleus. The patent does not indicate, however, that any intermediate product can be formed in which an ethyl group is attached to the adamantane nucleus.

It has now been found that adamantanes having one ethyl substituent and 0–3 methyl substituents can be obtained by isomerizing $C_{12}$–$C_{15}$ tricyclic perhydroaromatics under certain conditions and stopping the reaction at an appropriate time. The catalyst used is a pre-formed liquid complex obtained by reacting $AlCl_3$, HCl and paraffin hydrocarbon having at least seven carbon atoms. It has now been discovered that when such tricyclic perhydroaromatics and the pre-formed complex catalyst are contacted with each other while being heated, a rapid exothermic reaction takes place when the temperature exceeds $55°$ C. The product of this rapid reaction is the alkyladamantane containing an ethyl substituent. If the reaction is then stopped without permitting further isomerization to take place, isomer product containing an ethyl substituent can be obtained as the main product of the reaction. However, if the isomerization is allowed to proceed further, this product will disappear due to conversion of the ethyl group into two methyl groups. In practicing the present invention the reaction is stopped before this can happen.

In the present process any perhydroaromatic hydrocarbon which has three rings and from twelve to fifteen carbon atoms inclusive can be used. A table of numerous tricyclic aromatics which can be hydrogenated to produce corresponding $C_{12}$—$C_{15}$ perhydroaromatics is presented in the aforesaid patent. Any such perhydroaromatic hydrocarbon will readily isomerize under the conditions herein specified to form a product having an adamantane nucleus and an ethyl group attached thereto. The ethyl group predominantly will be at a bridgehead position of the nucleus.

According to the invention $C_{12}$–$C_{15}$ alkyladamantanes are prepared by contacting tricyclic perhydroaromatics of the $C_{12}$–$C_{15}$ range with a pre-formed $AlCl_3$ catalyst complex, prepared as hereinafter described, such contacting being at a temperature in the range of $55$–$110°$ C. at which the aforesaid rapid exothermic reaction occurs. Preferably the contacting is effected at a temperature in range of $65$–$95°$ C. In this reaction the perhydroaromatic converts to the adamantane structure, and it is characteristic of this conversion that the initial isomeric product contains an ethyl substituent. The ethyl group is located mainly at a bridgehead carbon atom although a minor portion of the isomeric product has the ethyl group at a non-bridgehead position. This conversion occurs within a short time when the temperature exceeds $55°$ C. If contacting of the catalyst and hydrocarbon phases were then continued, further isomerization could occur and the ethyl-containing isomers could be converted into polymethyladamantanes. Hence contacting of the catalyst and hydrocarbon is stopped after the initial isomerization has occurred and while ethyl-containing isomers constitute the main product. By "main product" is meant that an ethyl-containing isomer is present in higher proportion than any other isomeric product in the reaction mixture.

In the transition from the starting material to a fully isomerized product it has been found that the isomerization path or tricyclic perhydroaromatics leads through an intermediate stage at which an ethyl group is attached to the adamantane nucleus at both bridgehead and non-bridgehead positions. This is illustrated for the $C_{12}$ perhydroaromatic, acenaphthene, by the following equation:

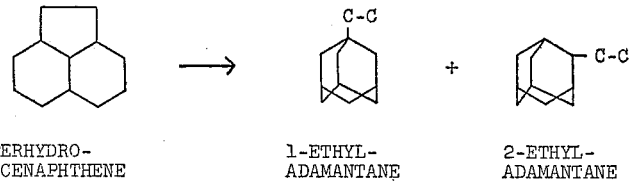

PERHYDRO-ACENAPHTHENE     1-ETHYL-ADAMANTANE     2-ETHYL-ADAMANTANE

Further isomerization will convert the ethyl group to two methyl groups which preponderantly will be located at bridgehead positions. Thus, if the isomerization were allowed to proceed to completion, the major final product obtained from perhydroacenaphthene would be 1,3-dimethyladamantane. In practicing the present invention, however, the isomerization reaction is stopped before this has occured so that the main product obtained is 1-ethyladamantane.

When the invention is practiced with a charge hydrocarbon which is a $C_{13}$, $C_{14}$ or $C_{15}$ tricyclic perhydroaromatic, the reaction similarly is stopped at the stage at which ethyl-containing intermediates are the major product. Thus, the major product is ethylmethyladamantane for a $C_{13}$ charge, ethyldimethyladamantane for a $C_{14}$ charge and ethyltrimethyladamantane for a $C_{15}$ tricyclic perhydroaromatic. In these products the ethyl substituents are attached predominantly to bridgehead carbon atoms.

In preparing the catalyst for use in the process $AlCl_3$ is suspended in a paraffin hydrocarbon or mixture of paraffins having at least seven and preferably eight or more carbon atoms per molecule and gaseous HCl is passed into the mixture. It is desirable to use isoparaffins such as highly branched octanes, nonanes or decanes for this purpose but straight chain paraffins can also be used. The reaction of the $AlCl_3$, HCl and paraffin hydrocarbon can be effected at room temperature, although the use of an elevated temperature such as $50$–$100°$ C. generally is desirable to increase the rate of reaction. For the best results at least five moles of the paraffin per mole of $AlCl_3$ should be employed. Under these conditions some of the paraffin evidently breaks into fragments, yielding a $C_4$ fragment which becomes the hydrocarbon portion of the complex. As reaction between the three catalyst components occurs the particles of $AlCl_3$ in suspension in the hydrocarbon become converted to the liquid complex. The addition of HCl is stopped before all of the $AlCl_3$ reacts so that the complex formed will contain some $AlCl_3$ particles suspended therein. Alternatively HCl is added until all of the $AlCl_3$ has reacted but some fresh $AlCl_3$ is suspended in the resulting complex before it is used as catalyst. The complex is a reddish brown, somewhat viscous liquid which is a relatively stable material.

In carrying out the process of the invention the preformed catalyst prepared as described above and the tricyclic perhydroaromatic charge are contacted in a reaction zone at a temperature in the range of 55–110° C., more preferably 65–95° C. This can be done batchwise by charging the hydrocarbon and catalyst complex to a reactor and then heating the mixture to the reaction temperature while it is being vigorously stirred. Alternatively streams of the hydrocarbon and catalyst complex can be heated separately to reaction temperature and then contacted vigorously to effect the rapid exothermic reaction. If desired free HCl can be present in the reactor and it has a catalyst-activating effect as hereinafter discussed, but this is not essential for the present purpose.

The proportion of catalyst complex to prehydroaromatic charged is no critical but it is usually desirable to employ a weight ratio of complex to hydrocarbon of at least 1:10. More preferably such ratio is at least 1:1 and considerably larger ratios, e.g. 10:1, can be used if desired. The reactor should be provided with means for agitating the mixture so as to effect good contact between the catalyst and hydrocarbon phases. Increases in the catalyst to hydrocarbon ratio and in the degree of agitation tend to expedite the reaction. Contacting of the catalyst and hydrocarbon phases preferably is carried out only so long as to effect the exotherm which accompanies the transformation of the tricyclic perhydroaromatic to ethyl-substituted alkyladamantanes but not so long as to convert the latter to bridgehead polymethyladamantanes in any substantial amount. The contacting is then stopped and the hydrocarbon product is separated from the catalyst layer. The desired ethyl-containing product can be recovered from the resulting hydrocarbon mixture by fractional distillation.

FIG. 1 of the accompanying drawings graphically illustrates the rapid exothermic reaction which occurs when a temperature of 55° C. is exceeded in conducting the present isomerization reaction. FIG. 1 is for the isomerization of perhydroacenaphthene and shows the temperatures of the hydrocarbon reactant and of the fluid heating medium as a function of time from start-up. The procedure employed was a follows: At room temperature perhydroacenaphthene and a pre-formed $AlCl_3$-HCl-hydrocarbon complex catalyst were charged to a reactor and gaseous HCl was admitted thereto to a pressure of about 25 p.s.i.g. The reactor had a jacket through which the fluid heating medium was continuously circulated and also was provided with a stirrer for intimately contacting the hydrocarbon and catalyst phases. The run was begun by starting the stirrer and by continuously pumping the heating medium through the jacket while heating it in a preheater to raise the temperature. The temperatures of the incoming heaing medium and of the hydrocarbon reactant were continually measured, and the two curves of FIG. 1 show the respective values obtained as against time.

As can be seen in FIG. 1 the temperature of the hydrocarbon reactant lags behind that of the heating medium in the initial heat-up period and for a time increases at more or less the same rate as the heating fluid temperature increases. However, when the hydrocarbon temperature exceeds 55° C., a strong exothermic reaction sets in, causing the hydrocarbon temperature to rise sharply above that for the heating medium. This reaction corresponds to the conversion of the perhydroacenaphthene to the adamantane structure and it mainly produces ethyl-adamantanes. For the present purpose the reaction preferably should be stopped as soon as this strong exothermic reaction has occurred in order that the resulting ethyladamantane will not be further isomerized to diethyladamantane. In any event the reaction is stopped while the ethyl-substituted alkyladamantane is the main product.

The time that the hydrocarbon and catalyst phases may be alowed to contact each other, following the exothermic reaction illustrated in FIG. 1, without reducing the ethyl-substituted alkyladamantane content to a minor amount depends on several factors. The main factors are temperature and degree of contacting and the presence or absence of free HCl in the reaction mixture. Increase of temperature and increase in the degree of contact of the two phases tend to expedite further isomerization and hence reduce the time that contact between the phases is permissible. Free HCl in the reaction mixture strongly accelerates isomerization from the ethyl-substituted to the polymethyl form, so that the permissible contact time is greatly dependent upon the presence or absence of HCl. This is illustrated by FIG. 2 of the drawings which is described in connection with the specific example which follows.

*Example*

An $AlCl_3$ complex catalyst was prepared by reacting 40 ml. of 2,2,5-trimethylhexane with 15 g. of $AlCl_3$ at 65–75° C. while bubbling HCl into the mixture. After essentially all of the $AlCl_3$ had reacted, the mixture was cooled and allowed to stratify, and the excess hydrocarbon was decanted. The catalyst layer was washed with 30 ml. of 2,2,5-trimethylhexane and then was blown at room temperature with nitrogen to remove any excess HCl.

A shaker bomb was charged with 10.5 g. of the so-prepared complex, 5.0 g. of uncomplexed $AlCl_3$ and 11.0 g. of perhydroacenaphthene. The latter was a mixture of mainly four isomers produced by hydrogenating acenaphthene empolying a Raney nickel catalyst. Without any free HCl being added the bomb was immersed in a water bath which had been heated to 90° C. With the bath maintained at such temperature the bomb was agitated for 177 minutes. Small samples of the hydrocarbon phase were taken at times of 60, 117, 177 minutes for analysis by vapor phase chromatography. After the third sampling the mixture was cooled to 0° C. and the bomb was pressured at that temperature with HCl to a pressure of 10 p.s.i.g. The bomb was then reheated to 90° C. and was agitated to continue the isomerization. The partial pressure of HCl under these conditions was about 13.3 p.s.i. Samples were taken corresponding to total reaction times (including the previous reaction period of 177 minutes) of 237 and 297. Analyses of the various samples are shown in Table I, which lists the products in the order of increasing boiling points.

TABLE I.—ISOMERIZATION OF PERHYDROACENAPHTHENE AT 90° C. WITHOUT AND WITH FREE HCl

| Reaction time, min | 60 | 117 | 177 | 237 | 297 |
|---|---|---|---|---|---|
| Free HCl | none | none | none | yes | yes |
| Composition of Product, wt. percent: | | | | | |
| $C_4$ paraffins | 1.6 | 2.6 | 2.7 | 2.2 | 7.4 |
| $C_5$ paraffins | 1.4 | 3.1 | 3.0 | 2.2 | 6.4 |
| $C_6$ paraffins | 1.3 | trace | 0.2 | 0.8 | 0.2 |
| $C_7$–$C_{11}$ | 4.0 | 2.8 | 2.3 | 3.2 | 2.1 |
| 1,3-dimethyl-A | 17.8 | 24.6 | 29.7 | 68.7 | 70.1 |
| 1,2- and 1,4-dimethyl-As. | 13.9 | 8.2 | 4.2 | 3.9 | 3.2 |
| 1-ethyl-A | 55.6 | 55.8 | 56.6 | 18.0 | 10.2 |
| 2-ethyl-A | 4.4 | 2.9 | 1.3 | 1.0 | 0.4 |

No perhydroacenaphthene remained in the reaction mixture by the time the first product sample was taken.

In FIG. 2 the values listed in Table I for the contents of 1-ethyladamantane, 2-ethyladamantane and 1,3-dimethyladamantane have been plotted against reaction time. Reference to FIG. 2 shows that without free HCl 1-ethyladamantane quickly formed and that it constituted over one-half of the reaction product when a one-hour reaction time was reached. However further conversion of this isomer did not then occur and its content remained steady at about 56%. A slow formation of the 1,3-dimethyl isomer occurred but this evidently was derived mainly through isomerization of the non-bridgehead dimethyl isomers and not 1-ethyladamantane. Thereafter, upon addition of free HCl, isomerization of the 1-ethyladamantane was expedited and it was rapidly converted to the bridgehead dimethyladamantane.

The results of Table I and FIG. 2 show that perhydroacenaphthene when contacted with the $AlCl_3$ complex catalyst at a temperature as herein specified will readily rearrange to ethyladamantane which is mainly the bridgehead isomer (1-ethyl-A). A small amount of the non-bridgehead isomer (2-ethyl-A) is also formed. In this example the exotherm which accompanies this rearrangement (as illustrated by FIG. 1) was not specifically detected, since temperatures within the bomb were not measured. However, the exotherm and accompanying rearrangement were probably complete long before the first time of sampling (60 minutes). The results further show that in the absence of free HCl it is not detrimental to allow the catalyst and hydrocarbon phases to contact each other for a relatively long time after the exotherm has occurred, although for present purposes there would be no benefit in doing so. On the other hand, if free HCl is present in the reaction mixture, isomerization to dimethyladamantanes is greatly accelerated and hence contacting of the phases soon must be stopped in order to obtain ethyladamantane as the main product.

When any other $C_{12}$ tricyclic perhydroaromatic (e.g., perhydrohydrindacene) is substituted for perhydroacenaphthene, substantially the same results are obtained as illustrated by the example. Likewise when any tricyclic perhydroaromatic of the $C_{13}-C_{15}$ range is used, analogous results are obtained. Any such charge hydrocarbon under the conditions specified for practicing the invention will undergo a rapid exothermic reaction indicating conversion from the perhydroaromatic structure to the adamantane structure. The immediate isomerization product mainly will have an ethyl substituent and from one to three methyl substituents depending upon the number of carbon atoms in the starting hydrocarbon. A number of ethyl-substituted isomers may be formed in each case but the main isomer generally will have the ethyl substituent at a bridgehead position. Thus from a $C_{13}$ charge the main isomer will be 1-ethylmethyladamantane, from $C_{14}$ 1-ethyl-dimethyladamantane and from $C_{15}$ 1-ethyl-trimethyladamantane.

In our copending application, Ser. No. 486,307, filed of even date herewith, the preparation of bridgehead polymethyladamantanes by contacting $C_{12}-C_{14}$ tricyclic perhydroaromatics with the $AlCl_3$ complex catalyst at 55–150° C. is described and claimed. In that process the presence of free HCl at a partial pressure above 0.1 p.s.i. is an essential feature, and contacting of the catalyst and hydrocarbon is carried out for a sufficient time to isomerize beyond the ethyl-substituted product and yield the bridgehead polymethyladamantane as the major product of the reaction.

The ethyl-substituted adamantanes prepared as herein described can be converted to the corresponding vinyl compounds by dehydrogenation of the ethyl-substituted compound. Such dehydrogenation is described and claimed in copending United States application Ser. No. 366,866, filed May 12, 1964, now Patent No. 3,255,268. This procedure involves contacting the ethyl-substituted adamantane at 480–580° C. and at reduced pressure with a suitable dehydrogenation catalyst such as chromia-alumina or platinum-on-alumina and recovering the resulting vinyl-substituted hydrocarbon from the reaction product.

We claim:

1. Method of preparing alkyladamantanes of the $C_{12}-C_{15}$ range having an ethyl group attached to the adamantane nucleus which comprises contacting a tricyclic perhydroaromatic having 12–15 carbon atoms with a preformed liquid complex obtained by reacting $AlCl_3$, HCl and paraffin hydrocarbon having at least seven carbon atoms, said contacting being at a temperature in the range of 55–110° C. at which a rapid exothermic reaction occurs, whereby isomerization takes place to form alkyladamantane including isomer having an ethyl group, stopping said contacting while said isomer is the main isomerization product, and recovering said isomer from the reaction mixture.

2. Method according to claim 1 wherein said perhydroaromatic contains twelve carbon atoms and said alkyladamantane is ethyladamantane.

3. Method according to claim 2 wherein the temperature is in the range of 65–95° C.

4. Method according to claim 1 wherein said perhydroaromatic contains thirteen carbon atoms and said alkyladamantane is ethylmethyladamantane.

5. Method according to claim 4 wherein the temperature is in the range of 65–95° C.

6. Method according to claim 1 wherein said perhydroaromatic contains fourteen carbon atoms and said alkyladamantane is ethyldimethyladamantane.

7. Method according to claim 6 wherein the temperature is in the range of 65–95° C.

8. Method according to claim 1 wherein said perhydroaromatic contains fifteen carbon atoms and said alkyladamantane is ethyltrimethyladamantane.

9. Method according to claim 8 wherein the temperature is in the range of 65–95° C.

References Cited

UNITED STATES PATENTS

| | | | |
|---|---|---|---|
| 3,128,316 | 4/1964 | Schneider | 260—666 |
| 3,258,498 | 6/1966 | Schneider | 260—666 |

DELBERT E. GANTZ, *Primary Examiner.*

V. O'KEEFE, *Examiner.*